US011428507B2

(12) United States Patent
Rasico et al.

(10) Patent No.: US 11,428,507 B2
(45) Date of Patent: Aug. 30, 2022

(54) BLAST-RESISTANT ESCAPE WINDOW

(71) Applicant: Navistar Defense, LLC, Melrose Park, IL (US)

(72) Inventors: James G. Rasico, Farmington, MI (US); John A. Green, Troy, MI (US); Anthony S. Beggs, Allen Park, MI (US); Louis A. Carnevale, South Lyon, MI (US); Gordon J. Wolverton, Orion, MI (US); Craig A. Newman, East Lansing, MI (US); David M. Gerst, Clarkston, MI (US); Dale S. Norman, Oxford, MI (US); Jeffrey M. Fsadni, Royal Oak, MI (US)

(73) Assignee: Navistar Defense, LLC, Lisle, IL (US)

( * ) Notice: Subject to any disclaimer, the term of this patent is extended or adjusted under 35 U.S.C. 154(b) by 252 days.

(21) Appl. No.: 16/845,874

(22) Filed: Apr. 10, 2020

(65) Prior Publication Data

US 2021/0318102 A1 Oct. 14, 2021

(51) Int. Cl.
*F41H 5/26* (2006.01)
*B60J 1/02* (2006.01)
*B60J 1/00* (2006.01)
*F41H 5/04* (2006.01)

(52) U.S. Cl.
CPC ............. *F41H 5/263* (2013.01); *B60J 1/006* (2013.01); *B60J 1/007* (2013.01); *B60J 1/02* (2013.01); *F41H 5/0407* (2013.01)

(58) Field of Classification Search
CPC ........ F41H 5/263; F41H 5/0407; B60J 1/006; B60J 1/007; B60J 1/02
USPC ....................................................... 296/146.1
See application file for complete search history.

(56) References Cited

U.S. PATENT DOCUMENTS

| | | | |
|---|---|---|---|
| 7,174,692 B1* | 2/2007 | Vickers ................... | E06B 5/125 52/204.593 |
| 8,382,191 B2* | 2/2013 | Hafften .................... | F41H 5/263 296/146.1 |
| 10,254,088 B1* | 4/2019 | Luster ...................... | B60J 1/006 |
| 2012/0124766 A1* | 5/2012 | Antonich ................ | F41H 5/263 15/250.3 |

* cited by examiner

*Primary Examiner* — D Glenn Dayoan
*Assistant Examiner* — Dana D Ivey
(74) *Attorney, Agent, or Firm* — Paschall & Associates, LLC; James C. Paschall

(57) ABSTRACT

A blast-resistant escape window for an armored combat ground vehicle has a cassette which fits within, and closes, a though-opening in a frame of a windscreen. Two releasable lever-operated locking mechanisms for releasably locking the cassette in the through-opening are mounted on the windscreen at opposite sides of the through-opening. The cassette can to be pushed out of the through-opening when the locking mechanisms have been operated to release the cassette from being locked to the windscreen, thereby providing an alternative exit for personnel in the vehicle.

21 Claims, 17 Drawing Sheets

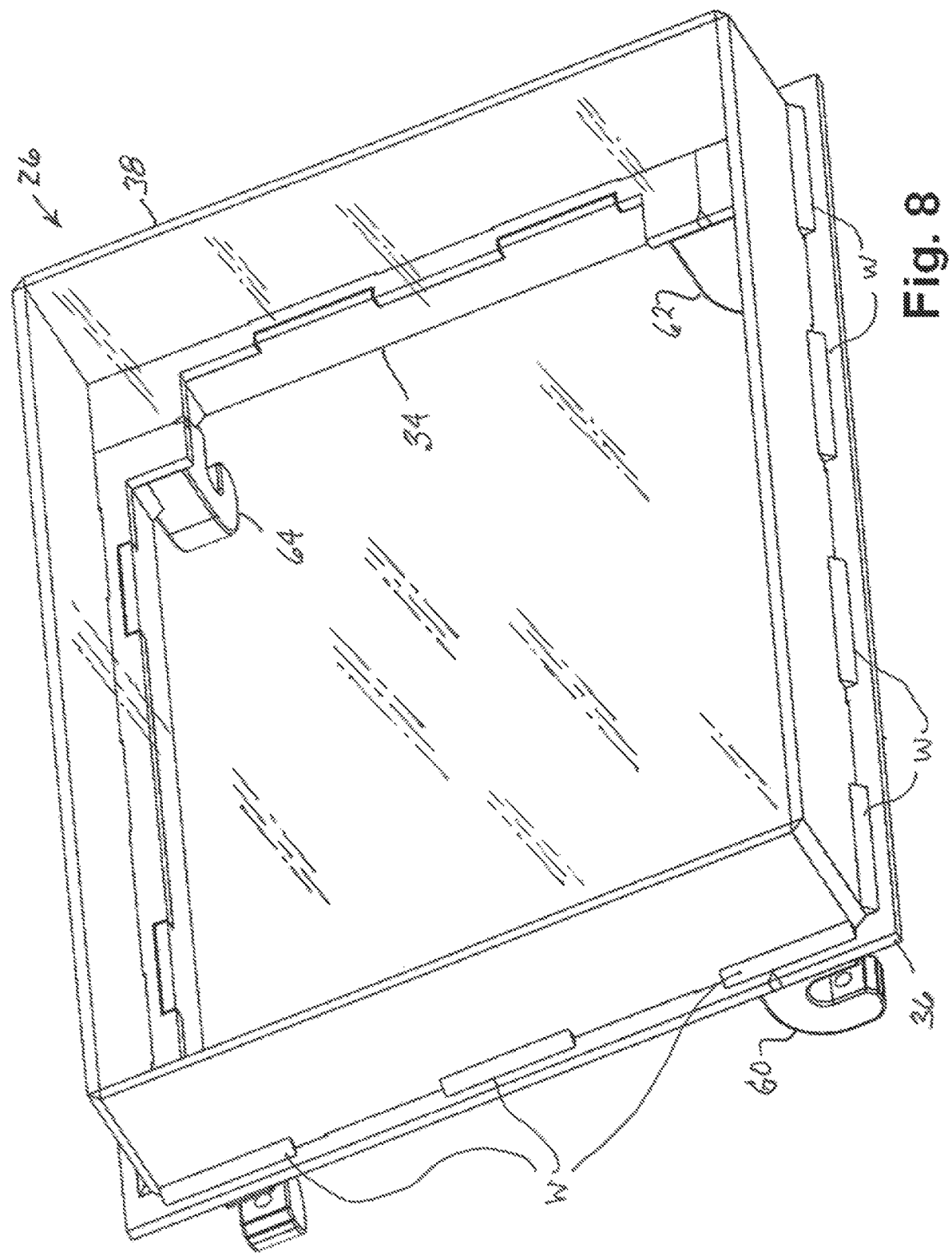

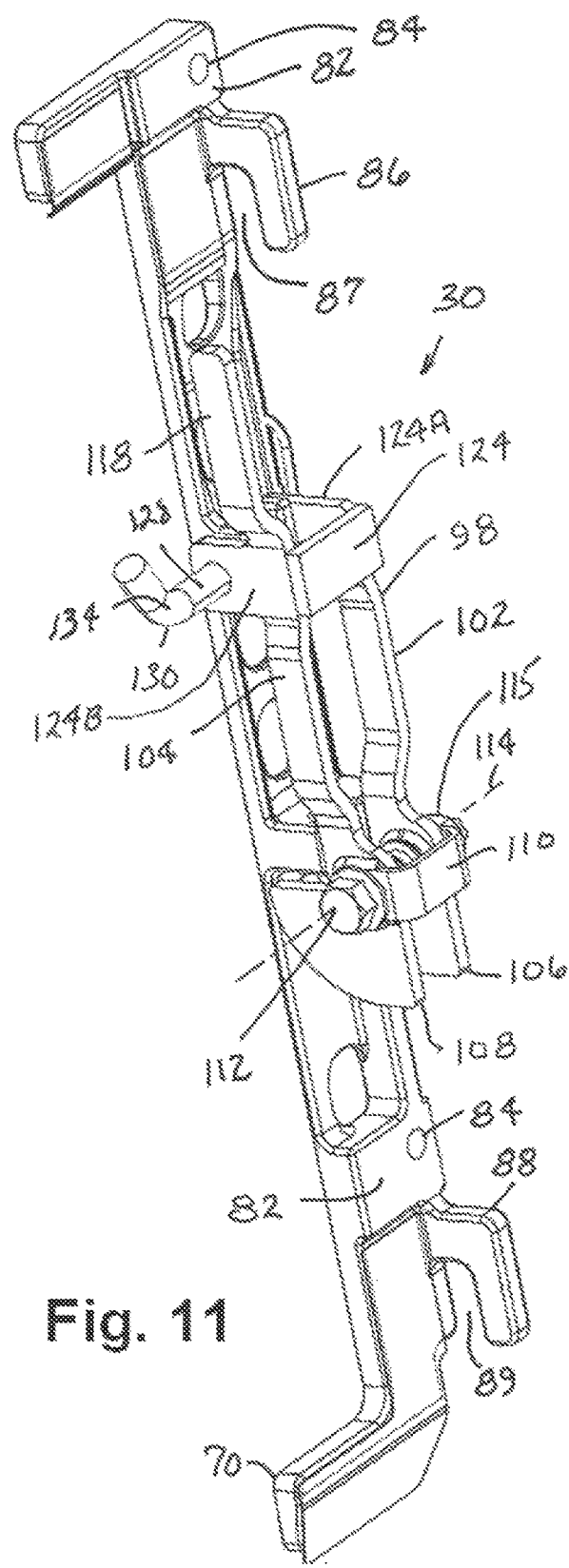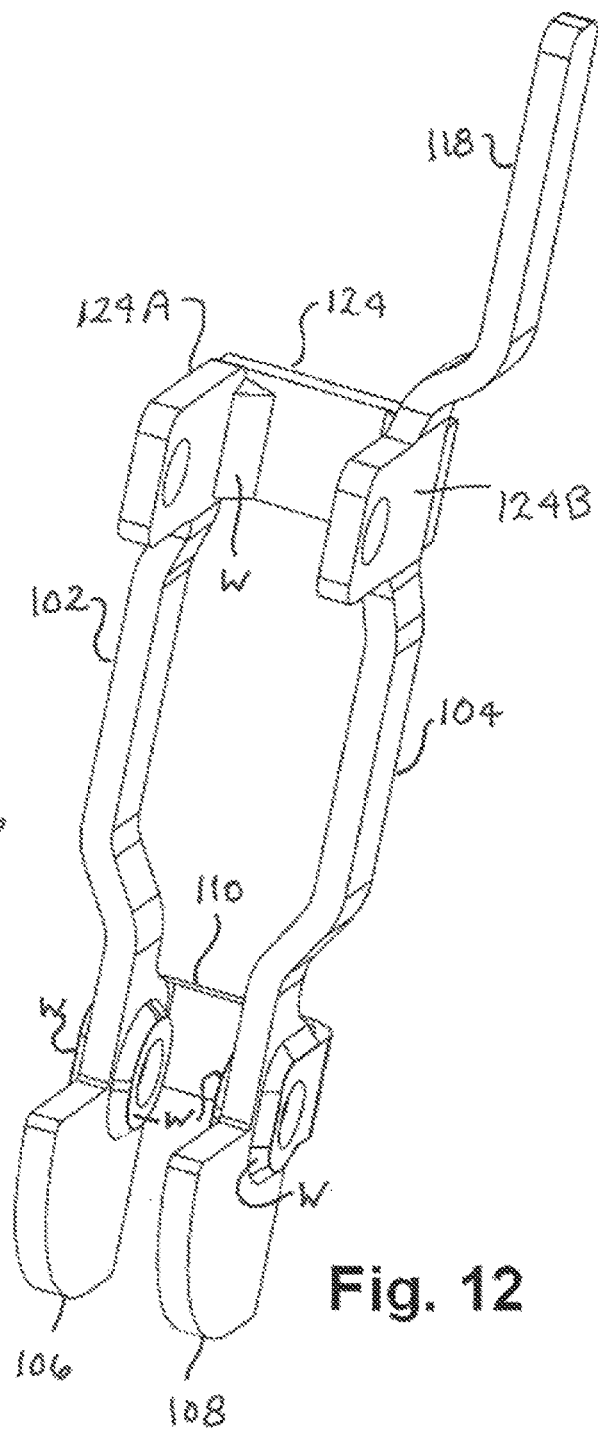
Fig. 11
Fig. 12

BLAST-RESISTANT ESCAPE WINDOW

TECHNICAL FIELD

The disclosed subject matter relates to a blast-resistant escape window for an armored combat ground vehicle, such as a Mine Resistant Ambush Protected (MRAP) vehicle used in tactical combat.

BACKGROUND

Examples of MRAPs are sold under the brand name MaxxPro. One model of MaxxPro vehicle has a rear entrance through which personnel can enter and exit the vehicle interior when a rear entrance door is open. When all personnel have entered the interior and taken their positions within the interior, the rear entrance door is closed, and the vehicle is ready for operation.

One of the personnel is a driver of the vehicle who sits in a driver's seat and operates controls for steering and propelling the vehicle; another is the commander of the vehicle who sits in a commander's seat. The seats are arranged side-by-side. The commander and the driver have visual access to a field of view in front of the vehicle. This arrangement allows the commander to focus on activities in the field of view and issue driving commands to the driver thereby freeing the commander from the task of operating vehicle controls.

Additional personnel may be seated rearward of the commander and driver, and such personnel may have access to a vehicle-mounted weapon, such as a turret-mounted machine gun in the vehicle roof, for firing at targets of interest as may be directed by the commander.

The commander and the driver can observe activities in the field of view through a respective transparent armor window in front of each of them.

U.S. Pat. No. 8,066,319 discloses an example of transparent armor window which fits within, and which closes, a through-opening in a windscreen. The window is held locked in closure of the through-opening by a releasable locking mechanism.

Such a releasable locking mechanism, when released, allows the window to be pushed out of the through-opening in a direction away from the interior of the vehicle by personnel inside the vehicle. The through-opening is sized to allow egress of personnel from the interior by crawling through the through-opening after the window has been pushed out. In that way the open through-opening provides a secondary exit in emergency situations where a primary exit, such as a rear entrance door mentioned above cannot open.

SUMMARY

The present disclosure relates to a blast-resistant escape window for an armored combat ground vehicle. The blast-resistant parts include a steel casing comprising an assembly of various machined parts joined together in various ways, mostly by welding, and a transparent armor window comprising a multi-layer lamination of transparent plastic and glass which fits within the casing to form a cassette which fits within, and closes, a though-opening in a frame of a windscreen of the vehicle. Two releasable locking mechanisms for releasably locking the cassette in the through-opening are mounted on the windscreen via carrier bars welded to the frame at opposite sides of the through-opening.

The cassette has a multi-section metal casing within one section of which a transparent armor window is immovably mounted. Catches are mounted on another section of the casing at locations which confront portions of the transparent armor window along opposite sides of the casing which are adjacent the opposite sides of the through-opening.

The locking mechanisms have respective metal shafts, each of which is guided by respective bearing assemblies mounted on the respective carrier bar for lengthwise translation parallel with that of the other shaft in a direction along the length of each of the opposite sides of the through-opening. Affixed to each shaft are metal locking parts each of which has some locking lugs which engage some of the catches on the cassette and other locking lugs which engage locking catches on the respective mounting bar when each locking mechanism is locking the cassette in place.

Each locking mechanism has a lever for translating its shaft. Each lever is mounted on a pivot block affixed to each shaft. The pivot block has a through-hole for enabling each lever to be swung about a pivot axis. When viewed along length of the pivot axis, the pivot axis is seen to be spaced from the respective shaft, but lying at 90° to the direction in which the shaft translates.

Each lever has outer and inner lever arms and an operating handle extending from the inner lever arm in a direction away from the pivot axis. Each lever arm also has a sector plate which turns with turning of the lever and which bears against a portion of a respective carrier bar to impart translation to the respective shaft with turning of the respective lever.

Each shaft is locked against translation along the respective carrier bar by a shaft lock mounted on the respective carrier bar to prevent the respective lever from being swung out of cassette-locking position. A shaft lock is unlocked by removing a locking pin which had been preventing the lever from turning.

With both shaft locks having been unlocked, operation of the levers of the locking mechanisms will begin to move the locking lugs out of engagement with the respective catches as the shaft translates out of cassette-locking position. Continued operation will reach a point where all locking lugs have been disengaged from all catches, allowing the cassette to be pushed out of the windscreen and enabling the through-opening in the frame to become an exit.

The foregoing summary is accompanied by further detail of the disclosure presented in the Detailed Description below with reference to the following drawings which are part of the disclosure.

BRIEF DESCRIPTION OF THE DRAWINGS

FIG. 8 is a perspective view, from the outside, of the window cassette shown in FIG. 7.

FIG. 11 is an enlarged perspective view showing a portion of one locking mechanism.

FIG. 12 is an enlarged perspective view of one part of FIG. 11.

DETAILED DESCRIPTION

Figure 1:
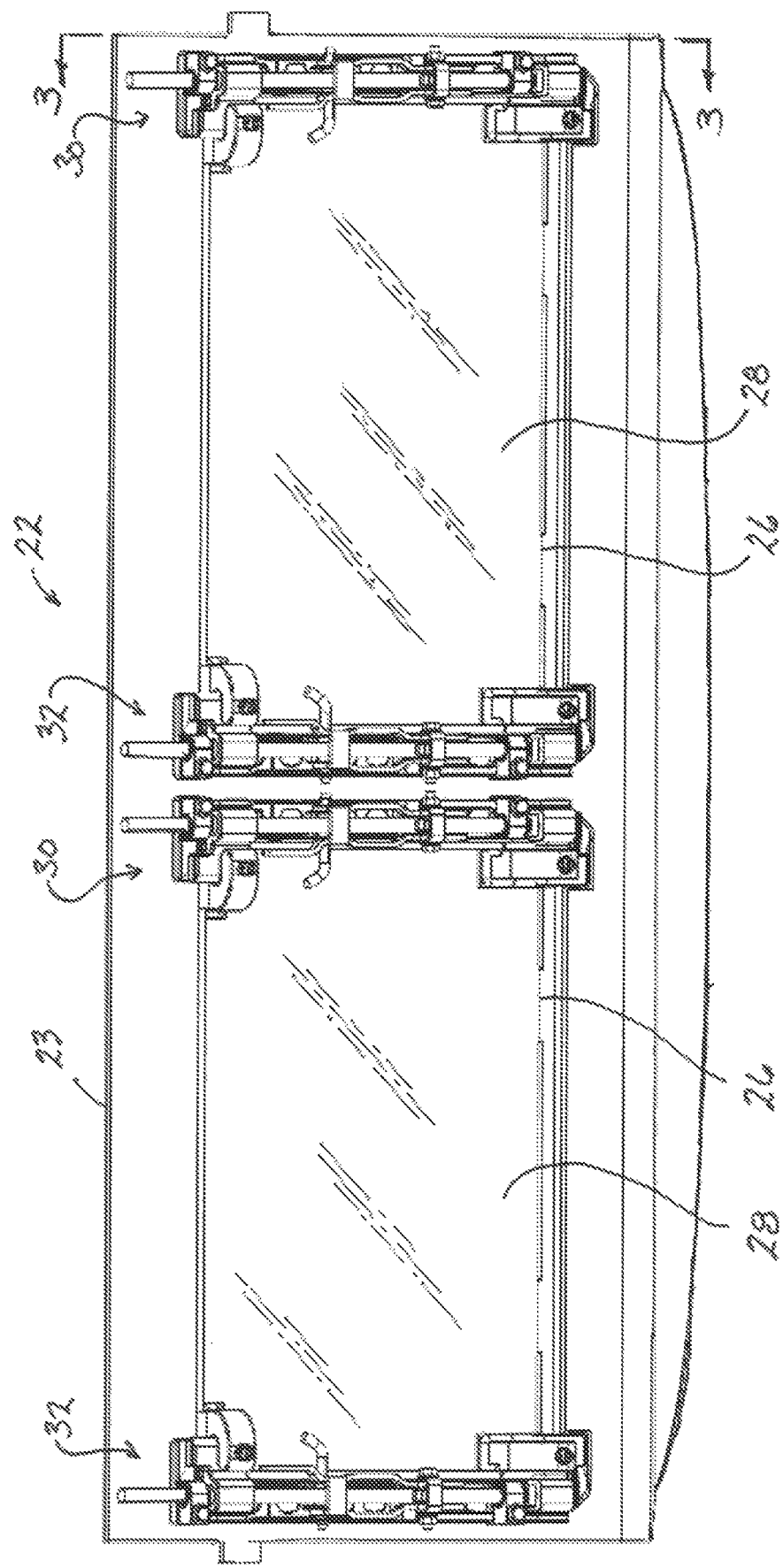
FIG. 1 is a view of a windscreen for an armored combat ground vehicle as would be seen by an occupant inside the vehicle when looking horizontally toward an outside field of view if the windscreen were installed in the vehicle.
Figure 2:
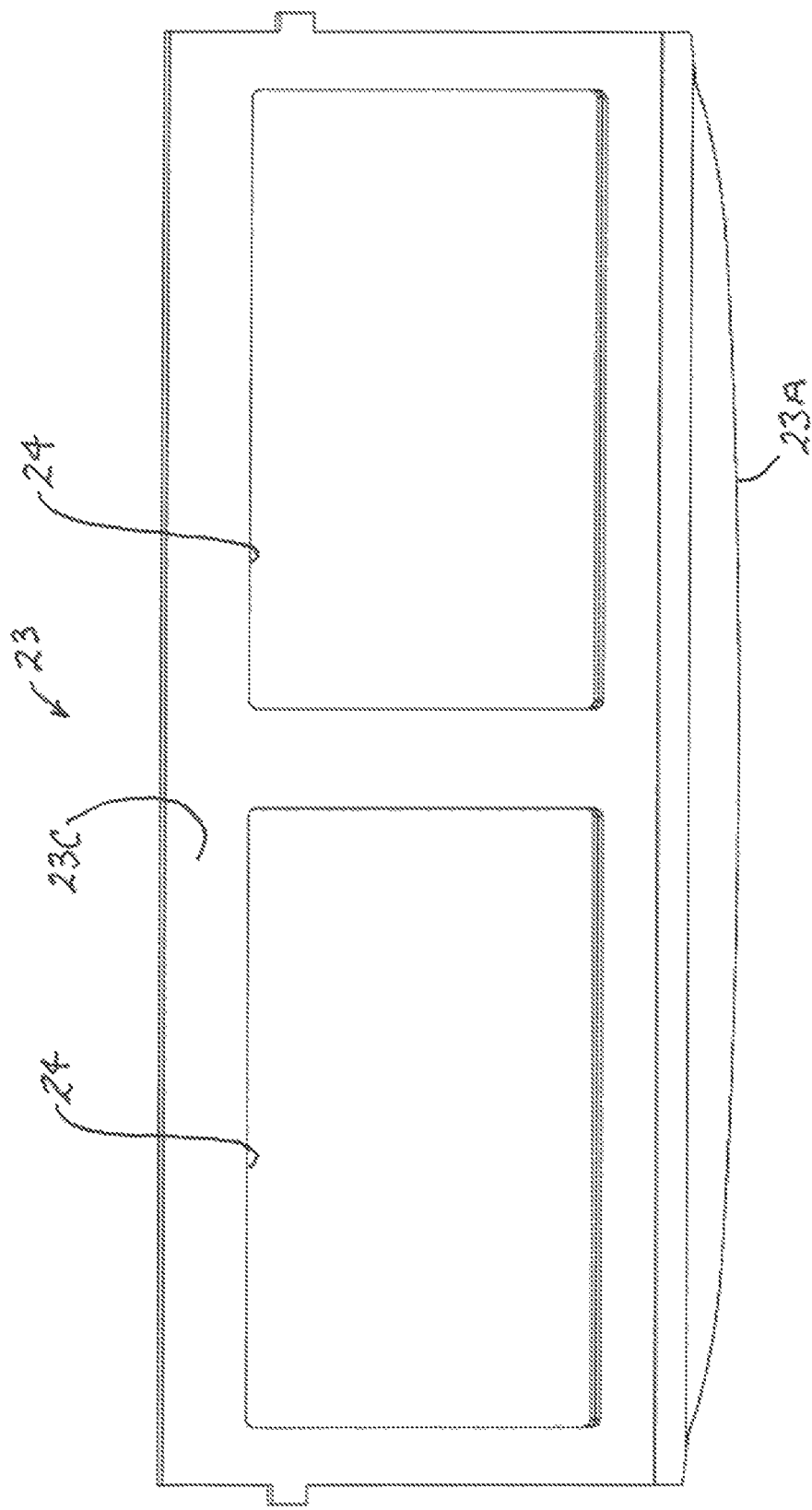
FIG. 2 is a view in the same direction as FIG. 1 of a frame of the windscreen shown by itself.
Figure 3:
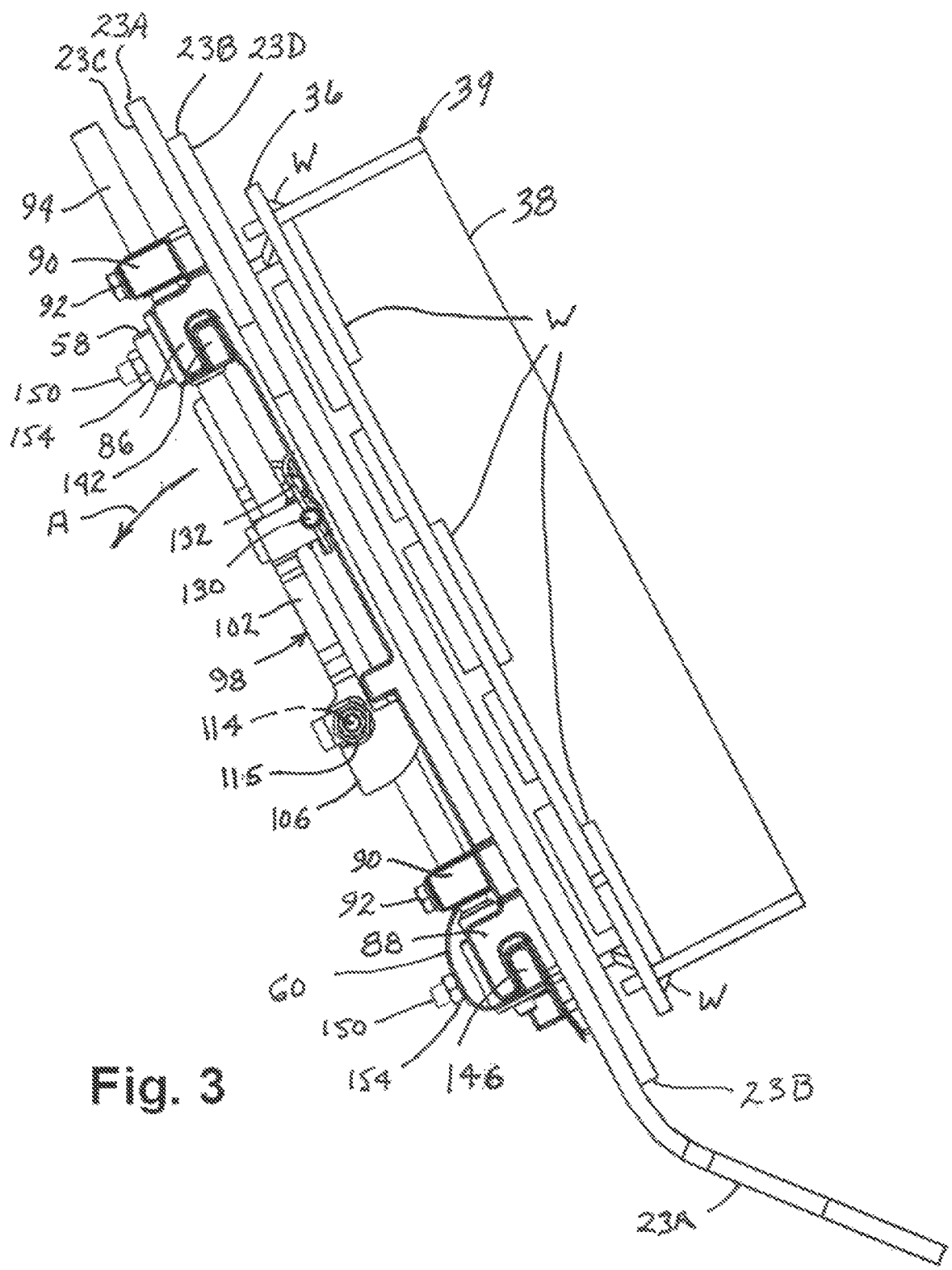
FIG. 3 is an enlarged view in the direction of arrows 3-3 in FIG. 1.

FIG. 1 shows a windscreen 22 having a metal frame 23 shown by itself in FIG. 2. Frame 23 is a two-part assembly having a larger inner frame part 23A and a smaller outer frame part 23B (see FIG. 3) which are welded together after being placed face-to-face flat against each other. Frame 23 contains two side-by-side rectangular through-openings 24, one on the right, the other on the left, extending between an interior surface 23C (see FIGS. 2 and 3) and an exterior surface 23D of frame 23. The longer sides of through-openings 24 run widthwise of an MRAP vehicle with windscreen 22 installed in the vehicle and the shorter sides run heightwise. A respective window cassette 26, which contains a transparent armor window 28, fits within and closes each through-opening 24.

As shown by FIGS. 1-4, through-openings 24 lie in an imaginary plane which inclines in a downward direction toward the front of an MRAP combat vehicle with windscreen 22 installed in the vehicle. A respective right locking mechanism 30 and left locking mechanism 32 releasably lock each window cassette 26 to frame 23.

The shape of transparent armor window 28 is that of a rectangular prism which has a rectangular interior face and a rectangular exterior face. Both faces have the same width as measured widthwise of the vehicle, and both have the same height as measured in directions perpendicular to their widths. The thickness of transparent armor window 28 is the distance between its interior face and its exterior face as measured in a direction perpendicular to those faces. Each window cassette 26 is a multi-part assembly within which transparent armor window 28 is immovably mounted. The construction of window cassette 26 and the mounting of transparent armor window 28 will be explained next with reference to FIGS. 5-8.

Figure 5:
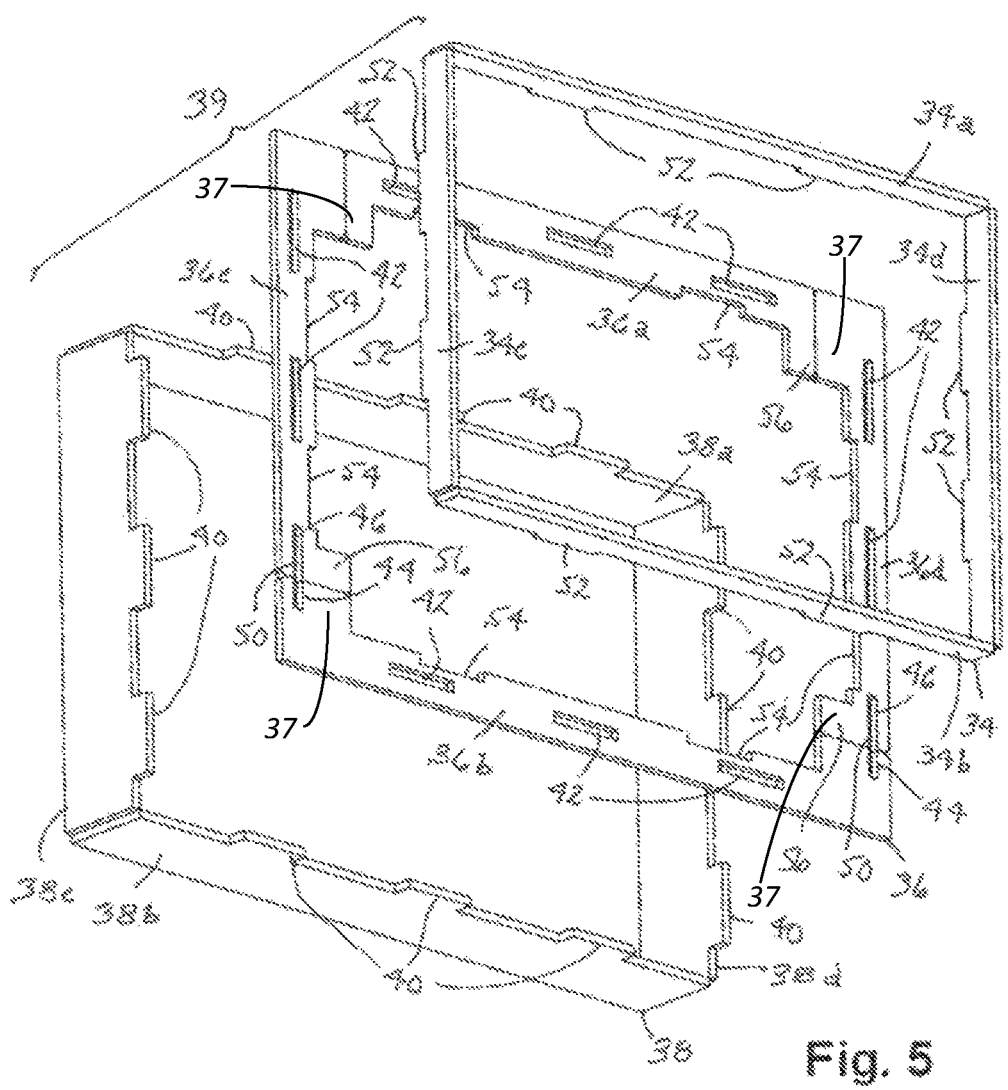
FIG. 5 is an exploded perspective view of three sections of a casing of the window cassette.
Figure 7:
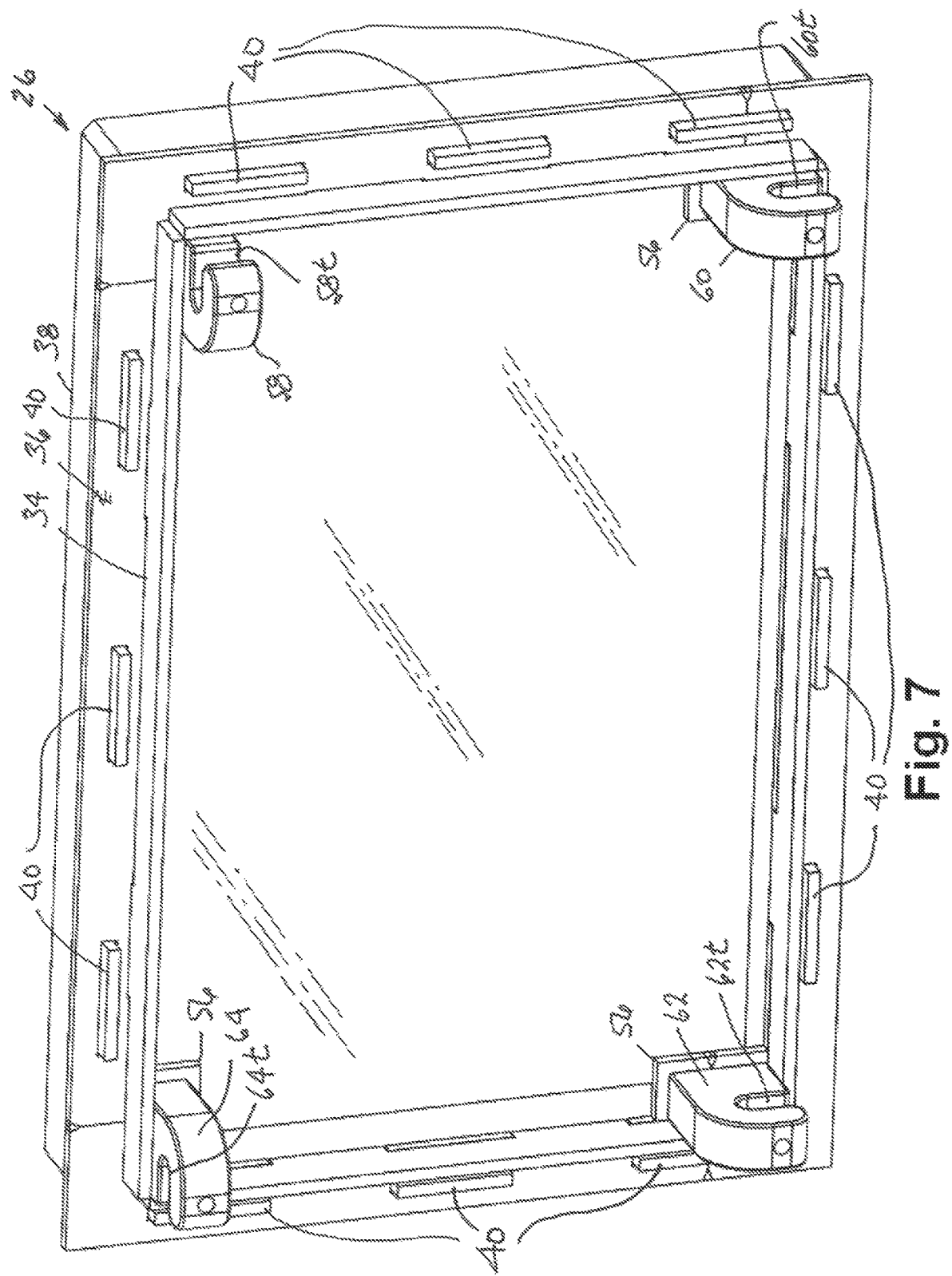
FIG. 7 is a perspective view, from the inside, of a completed window cassette showing the three-section casing with the transparent armor window immovably mounted in the casing.

The exploded view of FIG. 5 illustrates how various steel parts associate for creating three sections 34, 36, and 38 of a casing 39 for transparent armor window 28. FIG. 5 shows how the parts of each of the three sections fit together prior to any welding of parts and suggests how the three sections are intended to fit together to create casing 39 within which transparent armor window 28 will be mounted. FIGS. 7 and 8 show the finished window cassette 26 from different directions after casing 39 has been fabricated and transparent armor window 28 has been mounted in the casing. Some of the many welds are marked by a generic identifier W in these and other FIGS.

Section 38 comprises side members 38a, 38b, 38c, and 38d of equal thicknesses and equal nominal widths, with side members 38a and 38b being longer than side members 38c and 38d. Each side member is intended to be welded at each of its opposite lengthwise ends to a respective lengthwise end of an adjacent side member to create a rectangular perimeter wall surrounding an open center. Each of the four side members 38a, 38b, 38c, 38d has three rectangular tabs 40 which protrude from the respective side member's nominal width in a direction toward the interior of a vehicle to make those side members' widths at the location of each tab 40 slightly greater than their nominal widths. Transparent armor window 28 fits snugly within the rectangular perimeter wall of section 38 and is immovably held in place by adhesive (which cannot be seen in the FIGS.) between the surface of the window's outer perimeter and the surface of the inner perimeter of section 38, excluding surfaces of tabs 40. When transparent armor window 28 is mounted in casing 39, its interior face is flush with the surfaces of side members 38a, 38b, 38c, 38d which extend from tabs 40.

As further seen in FIG. 5, section 36 comprises four separate side members, namely longer side members 36a, 36b and shorter side members 36c, 36d which, when assembled together form a rectangular perimeter surrounding an open center. The thicknesses of side members 36a, 36b, 36c, and 36d are identical, and are measured in a direction perpendicular to the direction in which the thicknesses of side members 38a, 38b, 38c, and 38d are measured. The widths of side members 36a, 36b, 36c, and 36d are also measured in a direction perpendicular to the direction in which the widths of side members 38a, 38b, 38c, and 38d are measured. At its opposite lengthwise ends, each side member 36a, 36b, 36c, 36d has formations shaped to abut their thickness surfaces with the thickness surface of a respective formation of each of its two adjacent side members, as shown.

Side members 36c and 36d are mirror images of one another but side members 36a and 36b are not. Each side member 36a, 36b has three rectangular through-slots 42 of identical dimensions, and side member 36b has two three-sided, upwardly open, through-slots 44. Each side member 36*c* and 36*d* has two rectangular through-slots 42 of identical dimensions, and a single, downwardly open, three-sided through-slot 46 at the bottom. In each side member 36*a* and 36*b*, through-slots 42 are in mutual lengthwise alignment and are spaced apart from each other with the middle slot being equidistant from the other two through-slots.

Each through-slot 46 cooperates with a respective through-slot 44 in side member 36*b* to form a third rectangular through-slot 50 whose length is in alignment with the lengths of the two through-slots 42 in the respective side member 36*c*, 36*d*. The middle one 42 of the three aligned through-slots is equidistant from the other two through-slots 42 and 50.

Figure 6:
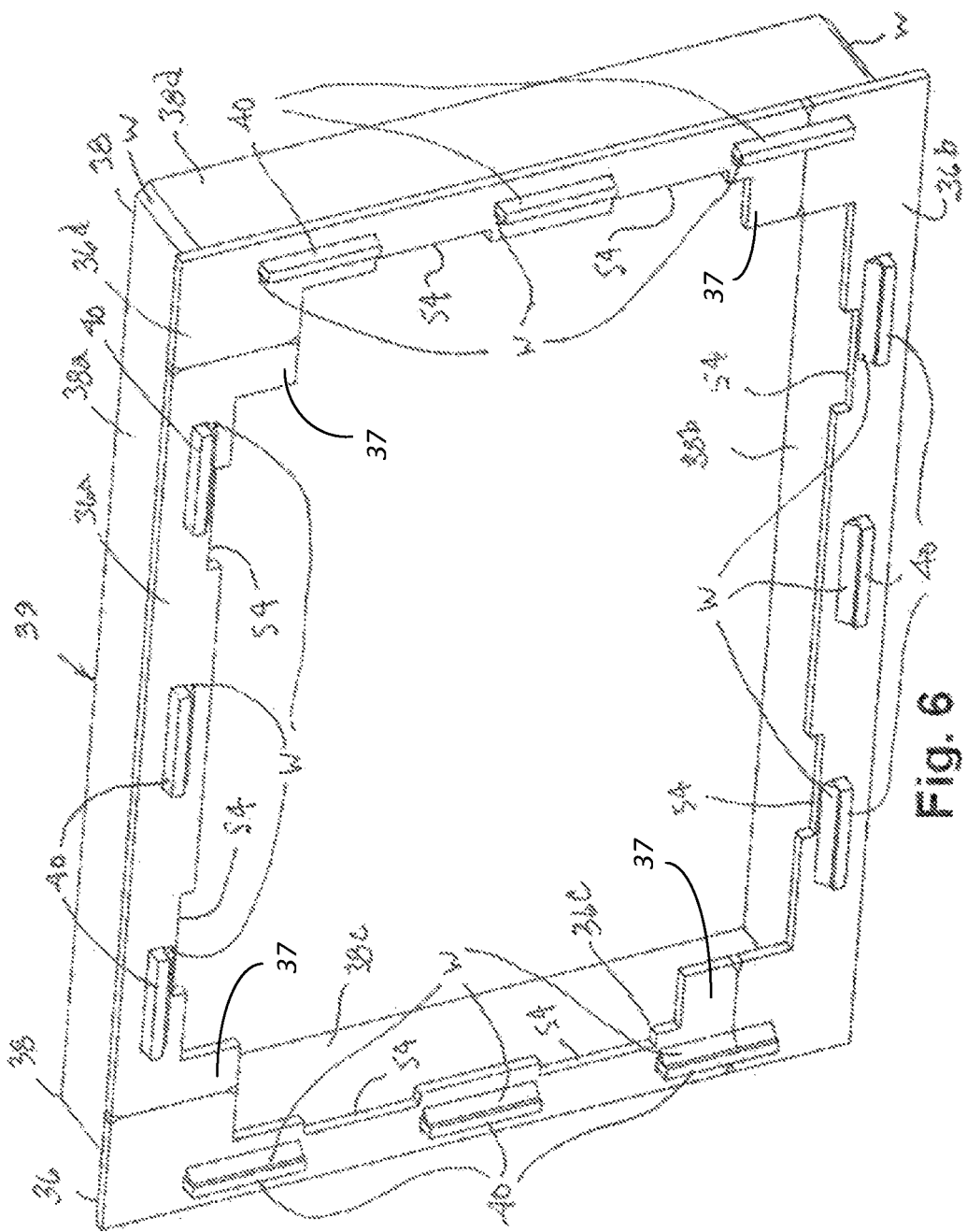
FIG. 6 is a perspective view showing two of the three sections having been assembled to each other and welded together.

As can be understood from FIG. 5, tabs 40 of individual side members 38*a*, 38*b*, 38*c*, 38*d* are located and dimensioned to pass through respective through-slots 42, 50, with close fits, when tabs 40 of each side member have been registered with the through-slots and the members are moved toward section 38 to cause the tabs to enter the through-slots. The tabs 40 become fully inserted when all have passed completely through the through-slots and protrude from the interior face of section 36, and surfaces of the thicknesses of side members 38*a*, 38*b*, 38*c*, 38*d* which are adjacent tabs 40 are abutting the flat surfaces of side members 36*a*, 36*b*, 36*c*, 36*d* which face away from section 34. FIGS. 6 and 7 shows tabs 40 welded to section 36, and FIG. 8 shows sides of section 38 welded to section 36.

FIGS. 5 and 7 show section 34 to comprise side members 34*a*, 34*b*, 34*c*, and 34*d* which, when assembled, to form a rectangular perimeter surrounding an open center. The side members are of equal thicknesses and equal nominal widths, with side members 34*a* and 34*b* being longer than side members 34*c* and 34*d*. FIG. 5 shows the arrangement of the side members before each side member is welded at its opposite lengthwise ends to a respective lengthwise end of an adjacent side member. Each of the four side members 34*a*, 34*b*, 34*c*, 34*d* also has two rectangular tabs 52 which are spaced apart lengthwise of the respective side member and which protrude from the respective side member's nominal width in a direction away from the interior of a vehicle to make each such side member's width at the location of each tab slightly greater than its nominal width. With section 38 abutting section 36 as explained above, tabs 52 are registered with three-sided slots 54 in side members 36*a*, 36*b*, 36*c*, and 36*d* and sections 34, 36 are moved together to fit tabs 52 to slots 54. Section 34 is then welded to section 36.

Figure 4:
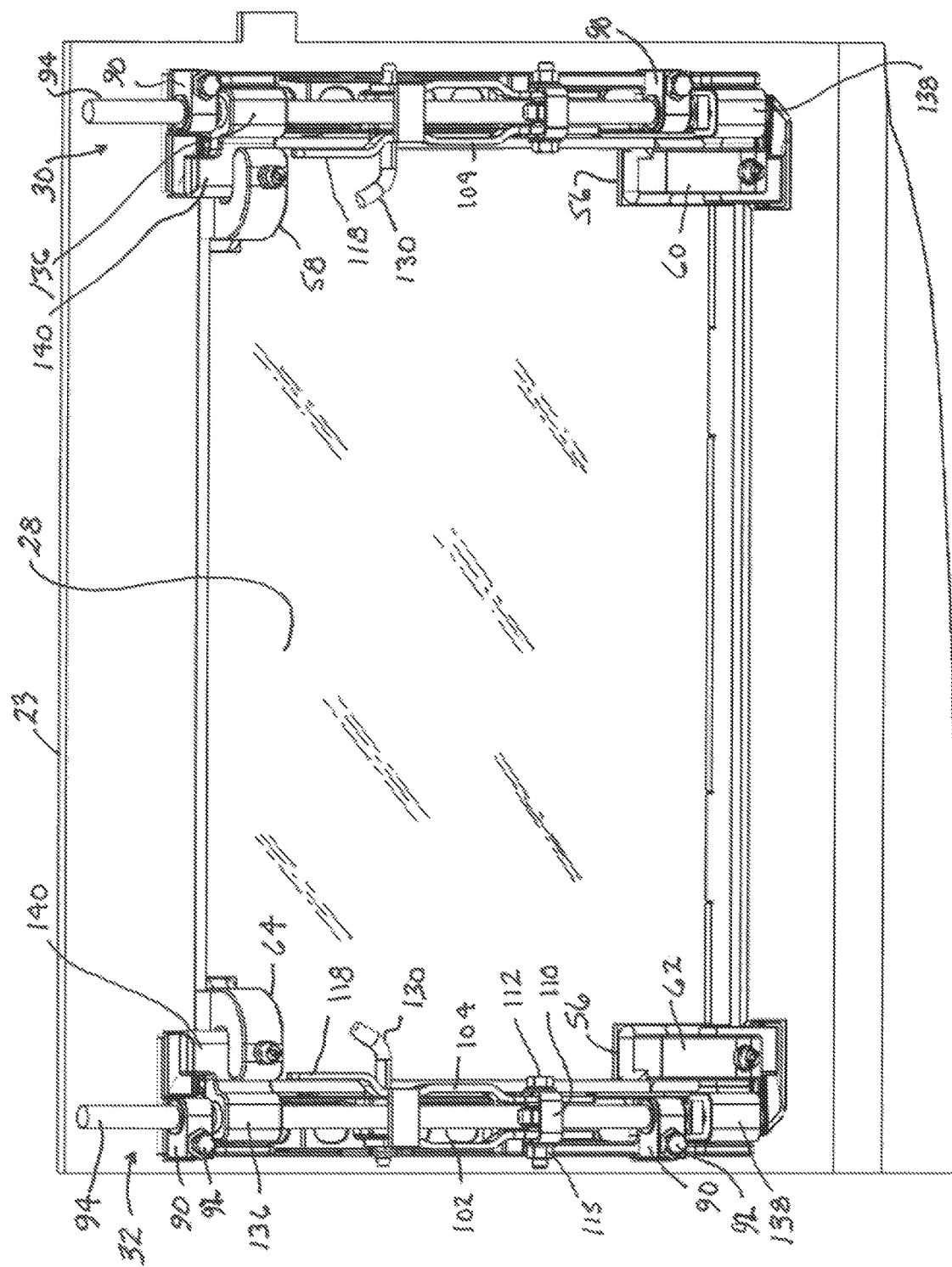
FIG. 4 is an enlarged view of the right half of FIG. 1 showing a window cassette disposed in a rectangular through-opening of the frame and two locking mechanisms which are mounted on the frame to the right and to the left respectively of the through-opening which are shown locking the cassette in place.
Figure 15:
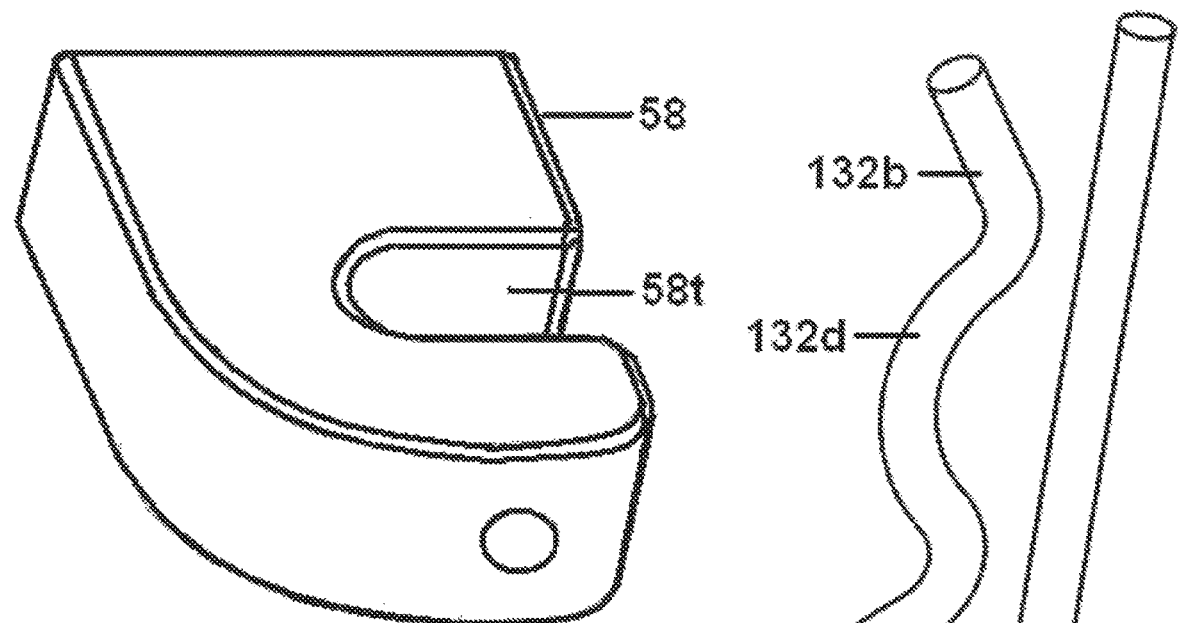
FIG. 15 is an enlarged perspective view of a part which mounts on the transparent armor window.
Figure 16:
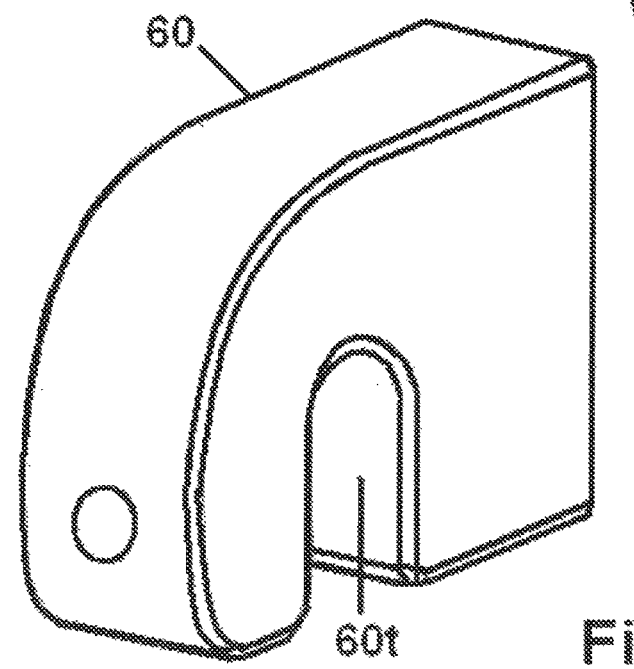
FIG. 16 is an enlarged perspective view of another part which mounts on the transparent armor window.

In the finished window cassette, section 36 has occluding zones 37 at widthwise opposite sides which occlude widthwise opposite zones of transparent armor window 28 while leaving a portion of the window between them unoccluded. Two areas of each occluding zone 37 occlude two areas of the rectangular interior face of transparent armor window 28 at two corners of the window's interior face. Those areas comprise cooperatively associated portions of the side members of section 36 adjacent the uppermost through-slots 42 and the lowermost through-slots 50 to form rectangular mounting pads 56, as shown in FIGS. 4 and 7. Each mounting pad 56 forms a flat interior-facing mounting surface to which is welded a respective one of catches 58, 60, 62, 64. These catches are also welded to the interior faces of section 34 in areas where they abut that section, and they are associated with locking mechanisms 30, 32 to lock window cassette 26 to frame 23 of windscreen 22. Catches 58 and 60 are separately shown by themselves in FIGS. 15 and 16.

Each catch 58, 60, 62, 64 has a respective throat 58*t*, 60*t*, 62*t*, 64*t*, as seen in FIG. 7. All throats are spaced the same distance from the interior surface of transparent armor window 28, and each opens in a particular direction. Throat 58*t* and throat 64*t* open widthwise of the window's interior surface in opposite directions away from each other, with throat 58*t* opening toward the right and throat 64*t* toward the left. Throats 60*t*, 62*t* open heightwise of the window's interior surface in a downward direction.

Figure 17:
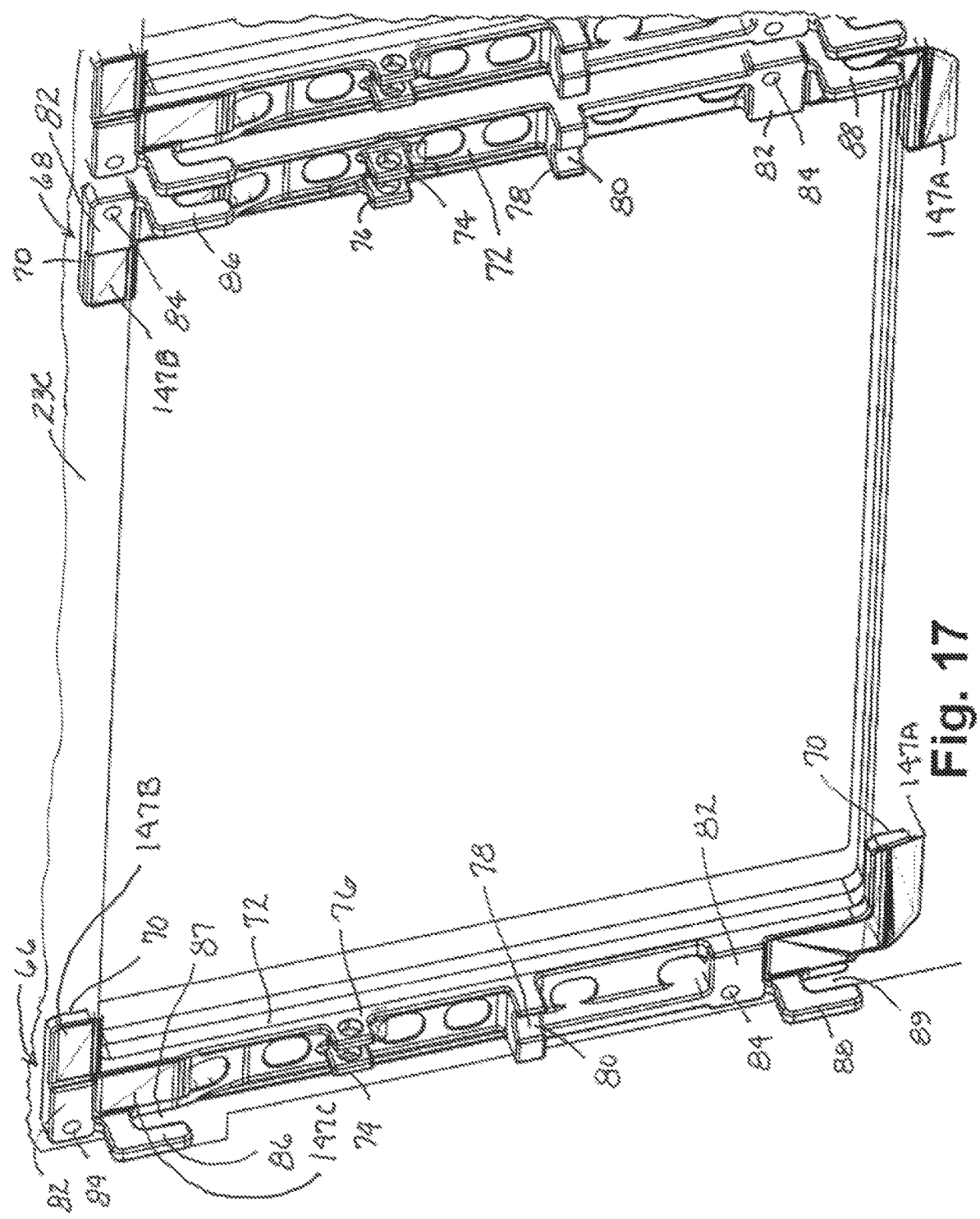
FIG. 17 is a perspective view of a portion of the windscreen with portions of the locking mechanisms removed to reveal certain parts which are mounted on the windscreen frame.

FIG. 17 shows the left portion of windscreen 22 with window cassette 26 and portions of locking mechanisms 30, 32 having been removed to provide a view of a left carrier bar 66 and a right carrier bar 68 which form portions of the locking mechanisms. The carrier bars have surfaces disposed against interior surface 23C of frame 23 along respective left and right margins of through-opening 24. Each carrier bar is fabricated by metal machining operations performed on an unmachined metal piece.

Upper and lower ends of each carrier bar 66, 68 comprise upper and lower end sections 70 having flat surfaces disposed against interior surface 23C. Each carrier bar further comprises an intermediate section 72 which extends lengthwise between its upper and lower end sections 70. Each intermediate section 72, like its ends sections, has a flat surface disposed against surface 23C. Each carrier bar 66, 68 is welded to interior surface 23. The welds include fillet welds around the margins of several through-holes in section 72 although the welds are not shown in FIG. 17.

Figure 10:
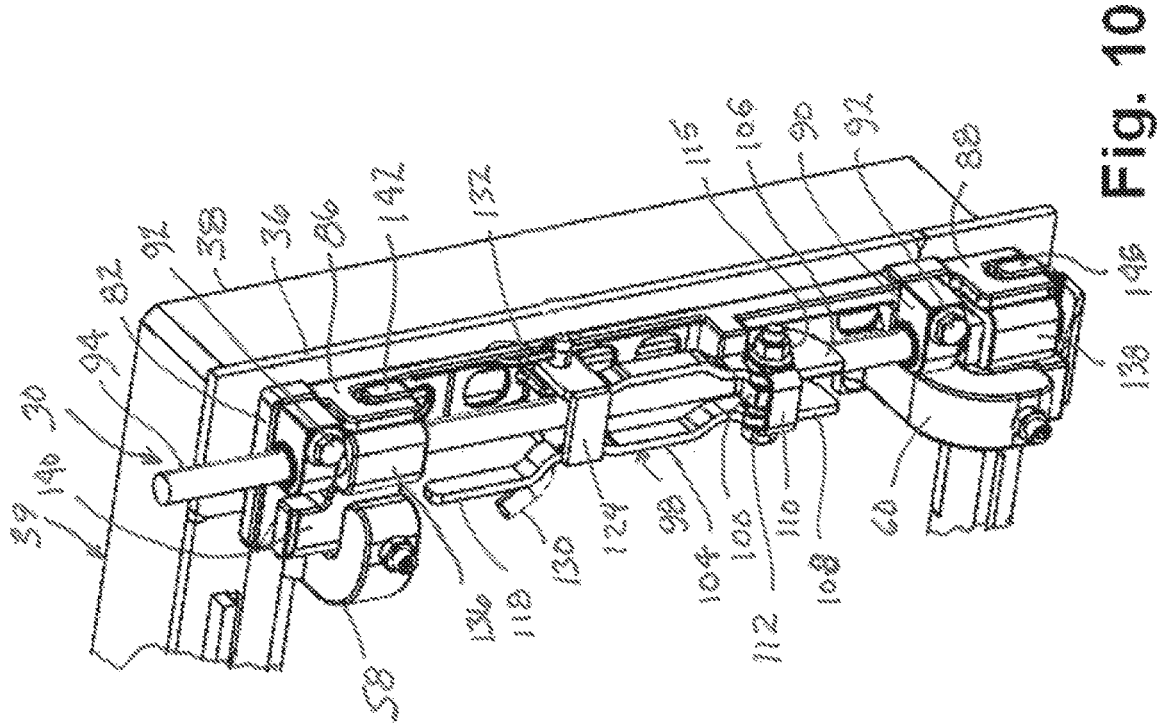
FIG. 10 is a perspective view of the other of the two locking mechanisms shown by itself on a larger scale.
Figure 9:
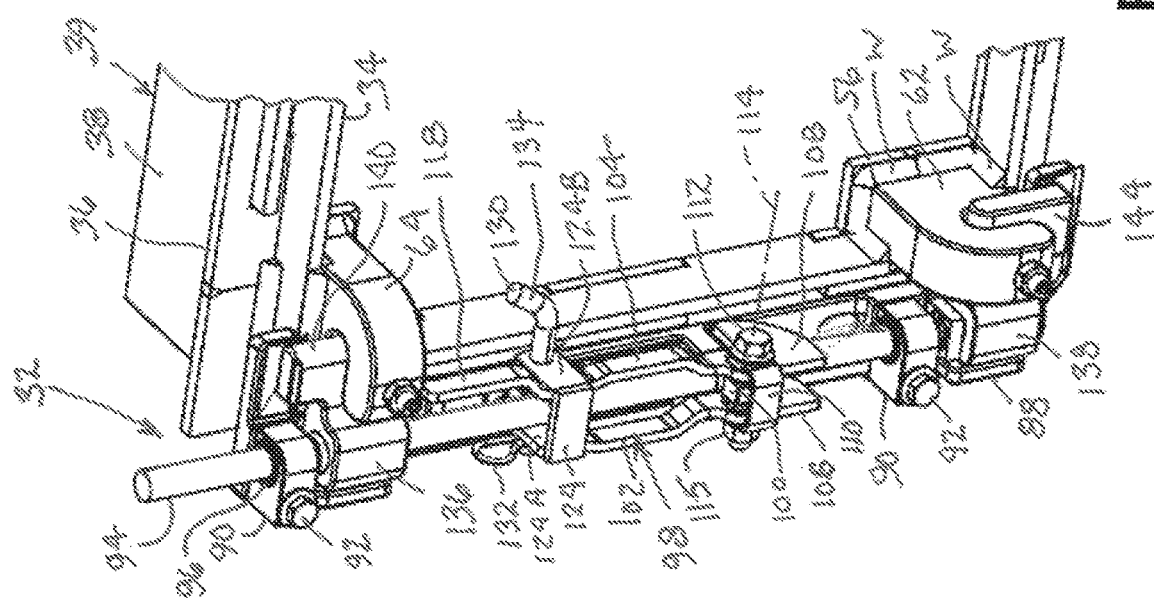
FIG. 9 is a perspective view of one of the two locking mechanisms shown by itself on a larger scale.

At respective locations below its upper end section 70, each intermediate section 72 contains two spaced part steel tabs 74, 76 created by machining operations on the unmachined metal piece. Farther below tabs 74, 76, each intermediate section 72 comprises a fulcrum piece 78 also created by machining operations on the unmachined metal piece. Each fulcrum piece 78 also has a front surface interrupted by a semicircular throat 80 which opens in a direction away from frame 23. Hence, tabs 74, 76 and fulcrum piece 78 are machined features of each carrier bar. Below fulcrum piece 78, each intermediate section 72 has a mounting pad 82 containing a hole 84 offset to one side. Upper end sections 70 have similar mounting pads 82 and offset holes 84. Bearing assemblies 90 shown in FIGS. 9 and 10 are disposed against mounting pads 82 and fastened in place using fasteners 92 threaded into holes 84. Details of the bearing assemblies will be more fully explained later.

Just below pads 82 of upper end sections 70, catches 86 (FIG. 17) are machined features of intermediate sections 72 and cooperate with the intermediate sections to form downwardly open throats 87, and still further below, catches 88 are machined features of intermediate sections 72 and cooperate with the intermediate sections to form downwardly open throats 89.

FIGS. 3, 4, 9, and 10 show that each of four bearing assemblies 90 has a metal casing with a flat surface disposed against a respective one of the four pads 82. A respective headed fastener 92 has a shank which passes through a first through-hole in each bearing assembly casing and threads into a hole 84 to hold the respective bearing assembly fast against the respective pad.

Each bearing assembly 90 also has a second, and larger, circular through-hole in its casing which does not intersect the first. A circular cylindrical sleeve of bearing material 96 (FIGS. 9 and 10) is fit to that larger through-hole to separate a circular, cylindrical steel locking shaft 94, which passes through a bearing assembly, from the bearing casing. Two bearing assemblies 90 guide lengthwise translation of the locking shaft of a respective locking mechanism 30, 32 mitigating friction which would otherwise occur by metal-to-metal contact during translation of the shaft through the casing. Throat 80 of fulcrum piece 78 provides clearance for contactless passage of locking shaft 94 through the fulcrum piece.

Figure 14:
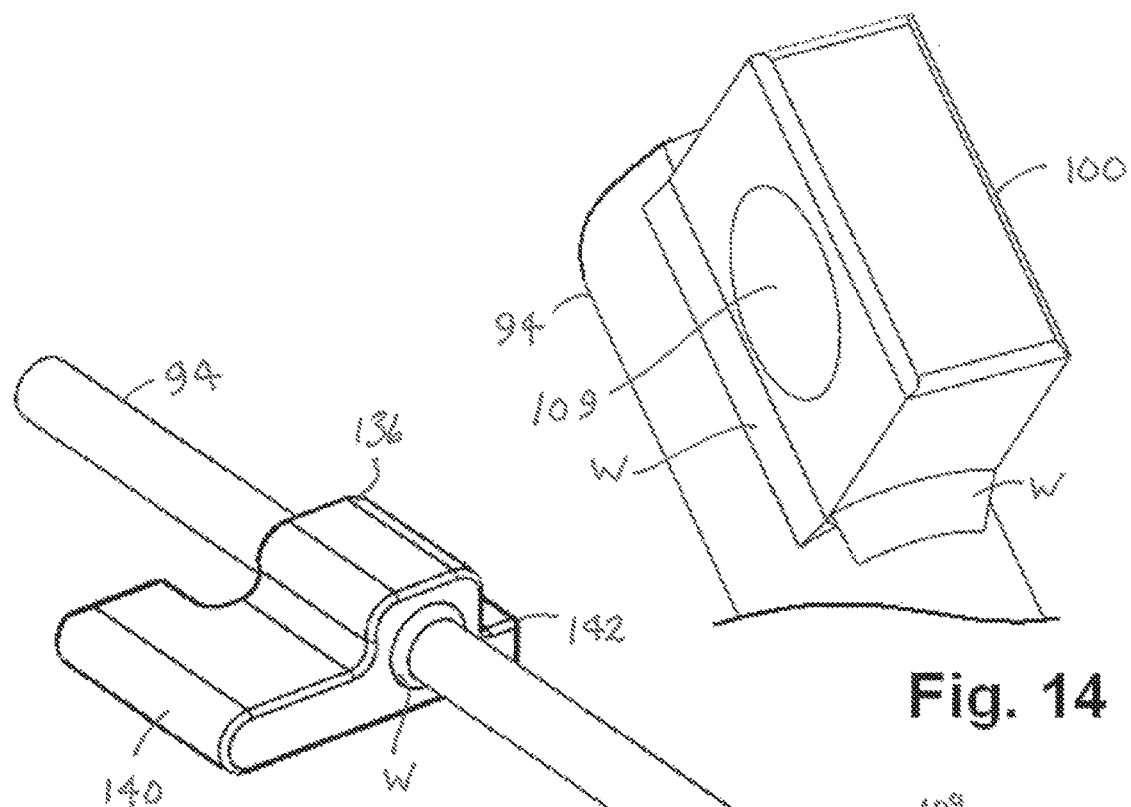
FIG. 14 is an enlarged view in circle 14 in FIG. 13.

Locking mechanisms 30 and 32 are symmetrical opposites of each other. A respective lever 98 for imparting translation to a respective locking shaft 94 is pivotally mounted on a pivot block 100 (FIGS. 13, 14) which is welded to the respective locking shaft 94. Shaft 94 has been removed from FIG. 11 to show a portion of right locking mechanism 30 on a larger scale, and FIG. 12 shows lever 98 by itself to provide more detail.

Lever 98 comprises an outer lever arm 102 and an inner lever arm 104. The lower ends of the lever arms comprise respective sector plates 106, 108 each of which is geometrically defined by an arc of a circle bounded by circumferentially spaced radii. The radii and arcs of the two sector plates are in lateral alignment with each other. At the intersection of the two radii bounding the arc, each lever arm has a circular through-hole which is centered on the intersection of the radii, placing these through-holes in mutual axial alignment. At the locations of these through-holes, outer lever arm 102 and inner lever arm 104 straddle pivot block 100 as shown in FIG. 10 and align with a circular through-hole 109 (FIG. 14) in the pivot block. Outer and inner sides of a U-shaped bridge 110 straddle sector plates 106, 108 and have mutually aligned through-holes. Weldments W on the insides of lever arms 102, 104 confront each other and serve to thicken both lever arms around their through-holes thereby reducing the size of a gap which would otherwise exist.

Each lever 98 is pivotally mounted on the respective pivot block 100 via a shank of a pivot shaft 112 which passes through an alignment of through-holes in sector plates 106, 108, through-holes in the sides of bridge 110, and through-hole 109 in pivot block 100. Pivot shaft 112 has a head at a proximal end of its shank and a thread at a distal end of its shank. A nut 115 is fastened to the thread and tightened to hold pivot shaft 112 secure while allowing lever 98 to turn freely about an axis 114 (FIG. 9). At the distal end of each inner lever arm 104 is a handle 118 which can be manually grasped to operate the respective lever 98, as will be more fully explained hereinafter.

Another part 122 (see FIG. 13) is affixed to shaft 94 above pivot block 100. Lever 98 has outer and inner tabs 124A, 124B (FIG. 12) which associate with part 122 by straddling part 122 from opposite sides. A bar 124 bridges the tabs and is welded to them. Tabs 124A, 124B have mutually aligned through-holes which align with a through-hole in part 122 when a locking mechanism is in cassette-locking position. The shank 128 of a lock pin 130 (FIG. 11) passes through those three through-holes thereby keeping the mechanism locked by preventing lever 98 from being turned about axis 114 to downwardly translate locking shaft 94 out of cassette-locking position. Part 122, tabs 124A, 124B, and lock pin 130 thereby form a lock for locking a locking mechanism in cassette-locking position.

Figure 20:
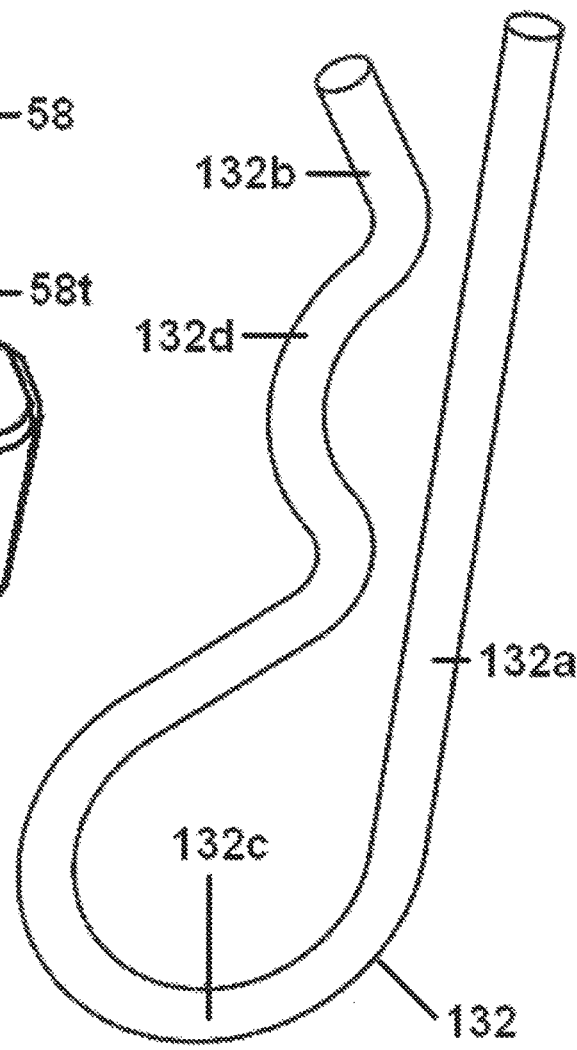
FIG. 20 is a perspective view of a wire hairpin clip.

The distal end portion of the lock pin shank 128 has a diametrically-extending through-hole. Lock pin 130 is kept in place by a wire hairpin clip 132 (shown by itself in FIG. 20) clipped onto the distal end portion of the shank with a straight leg 132a of the clip passing through the through-hole in the distal end portion of the lock pin. Clip 132 has a curved leg 132b. A reverse U-shaped bend 132c of greater than 180° joins proximal ends of the two legs. Between its proximal and distal ends, leg 132b has a curve 132d which resiliently embraces a portion of the circumference of shank 128.

Clip 132 is removed from lock pin 130 by a person manually grasping bend 132c between thumb and forefinger and pulling it to begin extracting leg 132a from the diametrically-extending through-hole in the lock pin. As the clip is being pulled, a portion of curve 132d rides along the lock pin, causing bend 132c to increasingly flex more open until curve 132d fully releases its embrace of the lock pin and allowing the clip to be completely removed.

Lock pin 130 has a bend 134 at an end opposite the clip. With clip 132 having been removed, a person's forefinger can be curled around bend 134 to enable the person to pull the lock pin completely out of the through-holes in part 122 and tabs 124A, 124B, thereby unlocking the locking mechanism. Instead of using a bend like bend 134, a pull cord (not shown) could by attached to the lock pin and grasped to pull the shank out.

After a locking mechanism has been unlocked, its handle 118 can be grasped to begin swinging its lever 98 in a downward arc (arrow A in FIG. 3) about axis 114. A corner at an end of the circular arc of each sector plate 106, 108 (which is blocked from view in FIG. 3 but can be seen in FIGS. 11 and 12) will bear against opposite sides of a U-shaped fulcrum surface of fulcrum piece 78 which surrounds throat 80 and faces in a heightwise downward direction. Because lever 98 is mounted on pivot block 100, downward translation force will be applied to shaft 94 with a mechanical advantage because handle 118 is at a much greater distance from pivot axis 114 than are the corners of the sector plates which are bearing against the fulcrum surface. That mechanical advantage aids in breaking the locking mechanism out of cassette-locking position and accelerating downward translation of locking shaft 94.

Each upper locking piece 136 contains two locking lugs 140, 142. Each lower locking piece 138 also contains two locking lugs 144, 146. When both locking mechanisms are locked, locking lugs 140 of the upper locking pieces fit snuggly in throats 87 of catches 86, locking lugs 142 fit snuggly in throats 58t, 64t of catches 58, 64, locking lugs 144 fit snuggly in throats 60t, 62t of catches 60, 62, and locking lugs 146 fit snuggly in throats 89 of catches 88 to hold window cassette 26 securely locked in place on frame 23. Initial downward translation of a locking shaft begins to translate the lugs of the upper and lower locking pieces through the throats of the respective catches which are engaged by the lugs. Concurrently, the spacing between the thickness surfaces of the circular arcs of the sector plates 106, 108 and the flat surface of the respective intermediate section 72, is maintained through the rotation of the handle and translation of the locking shaft due to the radial shape of the sectors. This condition is maintained as the points of contact of the sector plates with the fulcrum surface of piece 78 move along the fulcrum surface in a direction away from frame 23 of windscreen 22.

Figure 13:
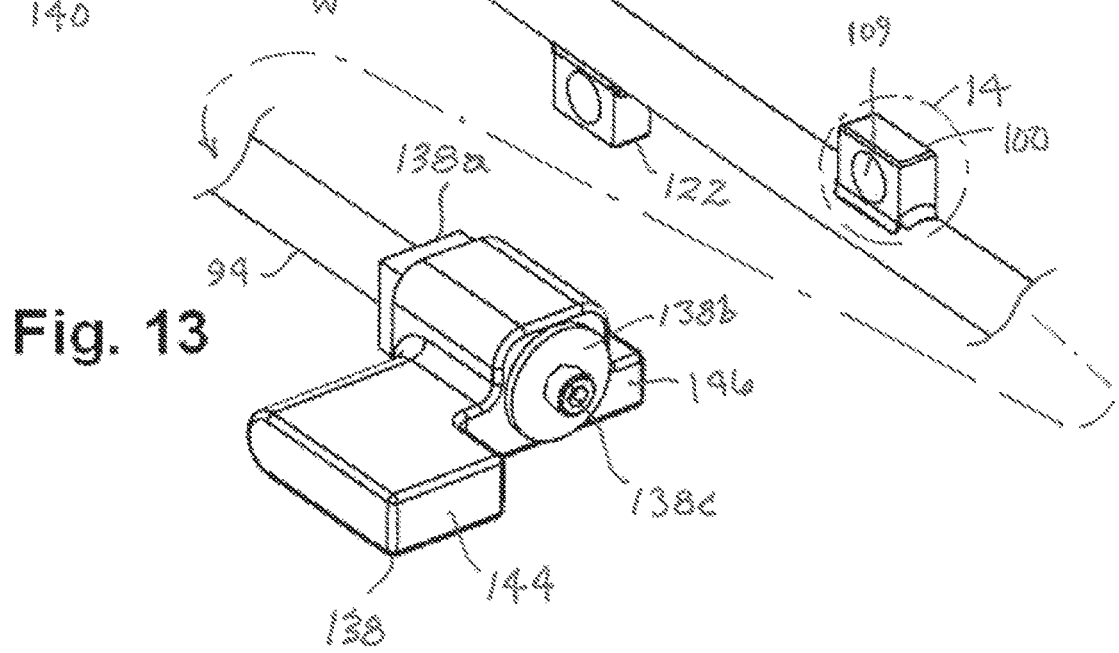
FIG. 13 is a perspective view showing another portion of the locking mechanism.

An upper locking piece 136 for both locking mechanisms 30, 32 can be seen in FIG. 4, which also shows lower locking pieces 138 for both locking mechanisms. Each upper locking piece 136 is affixed to a respective locking shaft 94. FIG. 13 shows locking shaft 94 of locking mechanism 30 by itself. While upper locking pieces 136 are affixed to their respective locking shafts, lower locking pieces 138 are allowed to turn on their locking shafts while being constrained against translation along their locking shafts.

FIG. 13 shows lower locking piece 138 of locking mechanism 30 to have a through-hole through which locking shaft 94 passes. Lower locking piece 138 is constrained against translation on the shaft by being axially captured between a collar 138a affixed to locking shaft 94 and a washer 138b which is fastened tight against the end of the locking shaft by a screw 138c which is threaded into a hole in the shaft end. Clearance between the through-hole in the locking piece and the locking shaft is just enough to allow the locking piece to turn without significant resistance.

Figure 22:
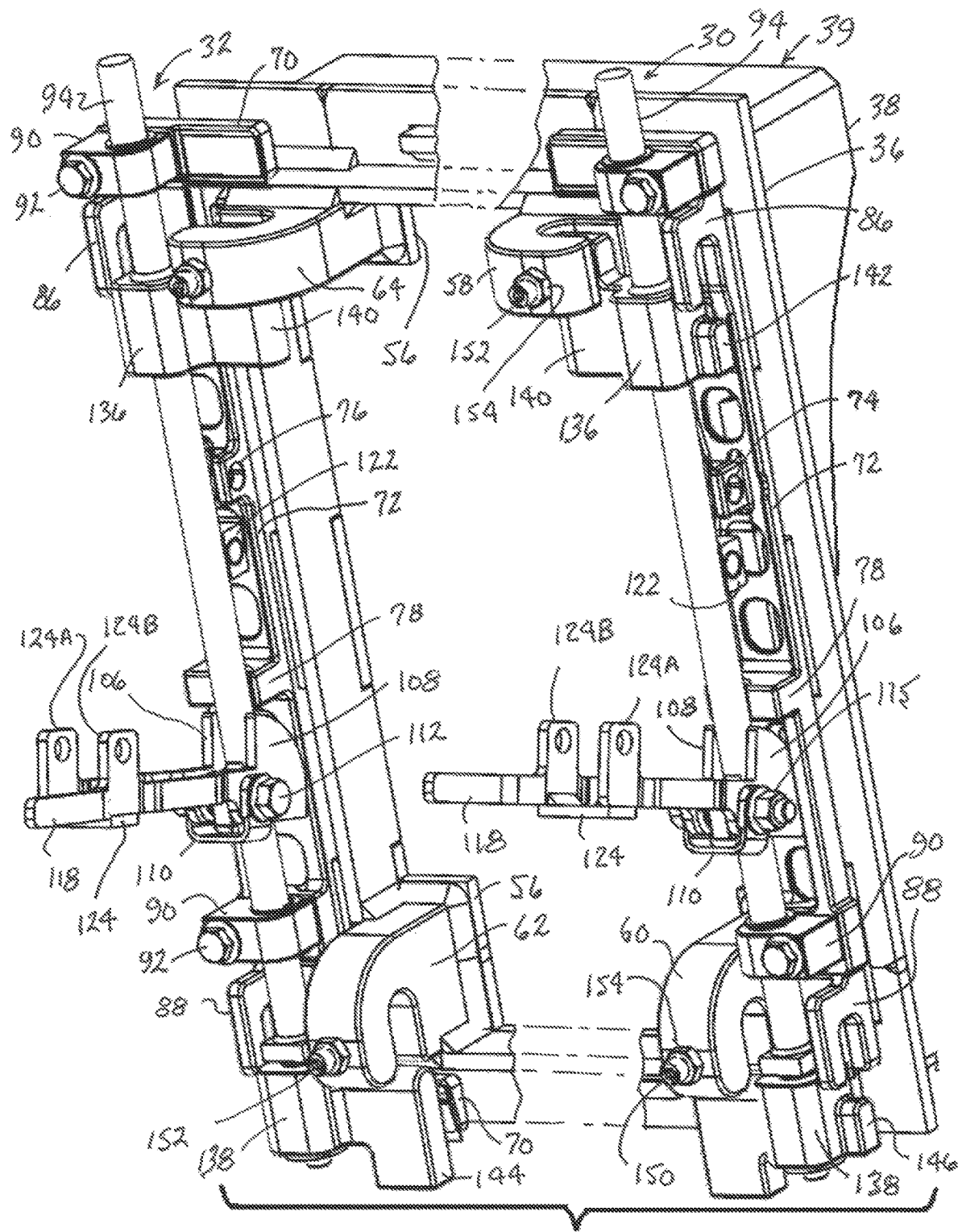
FIG. 22 is a perspective view showing the two locking mechanisms of FIG. 4 having been operated to positions which would occur during unlocking the window cassette.
Figure 23:
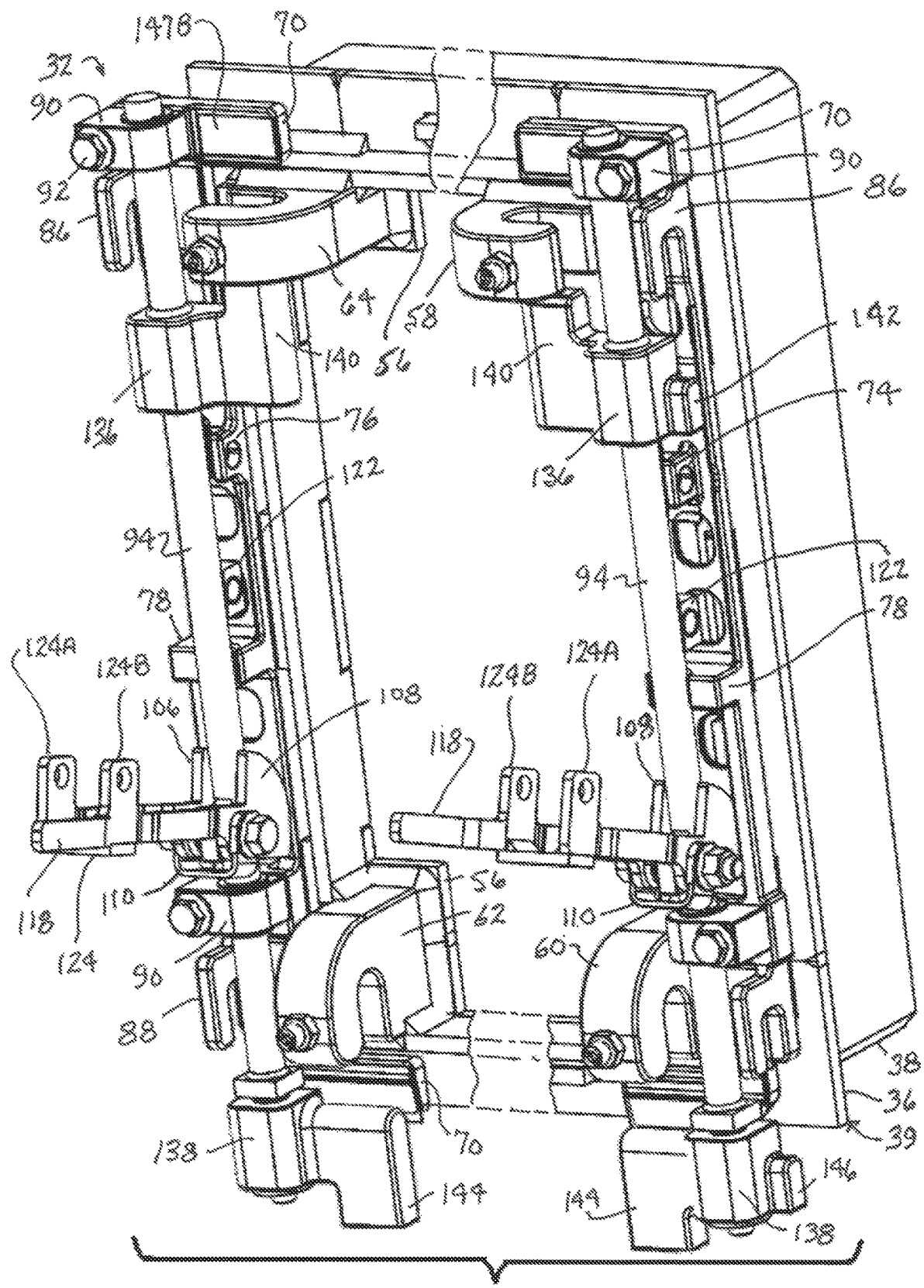
FIG. 23 is a view similar to FIG. 22 but showing the two locking mechanisms after they have been operated to positions which unlock the window cassette from the windscreen.

As levers 98 continue to be swung about axis 114 to translate locking shafts 94, all locking lugs continue to move with the locking shafts. FIG. 22 shows a condition after about 65° of turning of the levers where the lugs of lower locking pieces have disengaged their catches but the upper locking pieces are not yet fully disengaged. Continued downward translation of locking shafts 94 by operation of levers 98 will free the upper locking pieces from their catches, a condition shown in FIG. 23 allowing personnel inside a vehicle to push window cassette 26 out of through-opening 24, thereby opening an alternative escape exit from the vehicle.

FIG. 22 shows sector plates 106, 108 having lost contact with fulcrum pieces 78 which deprives levers 98 of their prior mechanical advantage. However, with the lower locking pieces having been disengaged from the catches, reduced effort is needed to disengage the upper locking pieces which are almost fully released. Levers 98 can be turned until bridge 110 hits shaft 94 to arrest further turning of the lever about axis 114. However if necessary, the levers can be used to pull the locking shafts even farther and thereby assure that the mechanism is unlocked.

Figure 21:
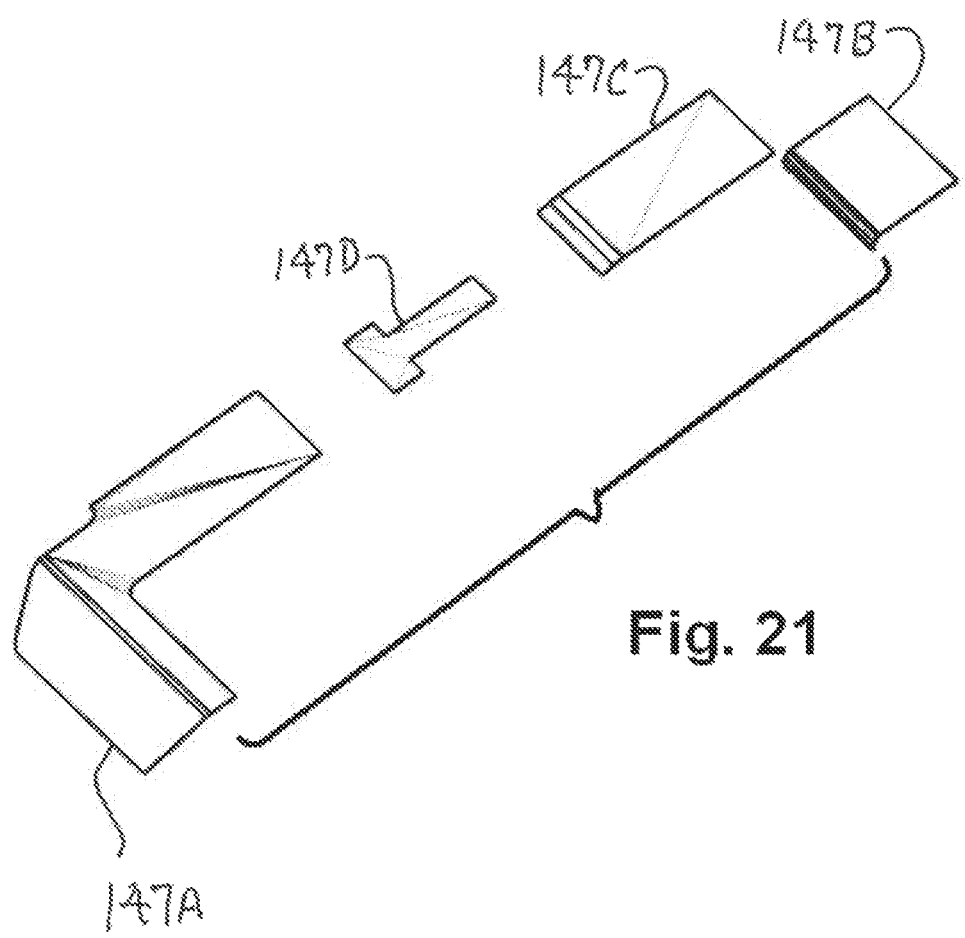
FIG. 21 is a perspective view which shows several bearing tape strips in FIG. 17 by themselves.

Certain surfaces of carrier bars 66, 68 are covered by strips of bearing tape 147A, 147B, 147C, 147D, shown by themselves in FIG. 21, for mitigating friction between the carrier bars and certain parts of the locking mechanisms. An example of a bearing tape is IGUS bearing tape made by Igus® inc., Providence, R.I. In FIG. 17, strips 147A are shown covering lower end section 70 and an adjoining portion of intermediate section 72 for mitigating friction if the locking lugs of lower locking piece 138 unintentionally come into contact with carrier bar surfaces during unlocking. Strips 147B, 147C do the same for upper end section 70 and an adjoining portion of intermediate section 72 with respect to locking lugs of upper locking piece 136. Strip 147D would similarly mitigate friction of part 122 (see FIG. 13) with a surface of intermediate section 72 of a carrier bar during unlocking. Symmetrically opposite tape pieces are applied to both right and left locking mechanisms in FIG. 17.

When locking mechanisms 30, 32 are in cassette-locking position, individual parts whose respective dimensions are within manufacturing tolerances may nevertheless result in a tolerance stack-up which causes a slight looseness in a locking mechanism which can make the mechanism prone to vibration when the vehicle is in operation. For example, such looseness may be caused by the magnitude of dimensional clearance between confronting surfaces of a locking lug and a catch.

Figure 18:
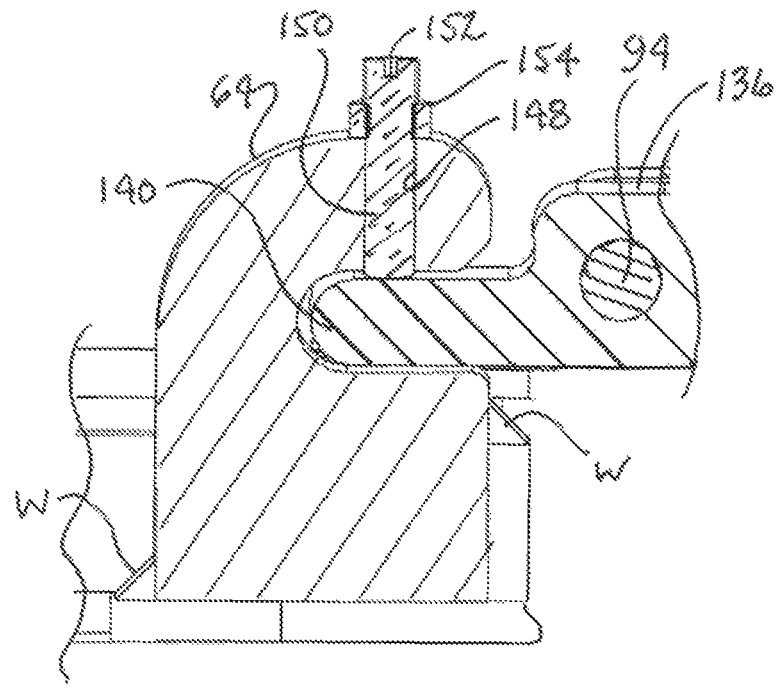
FIG. 18 is an enlarged fragmentary side view, partly in cross section, showing detail of a snubber in a catch for mitigating vibration which might otherwise occur during vehicle operations by taking out excess clearance between the catch and a locking lug.
Figure 19:
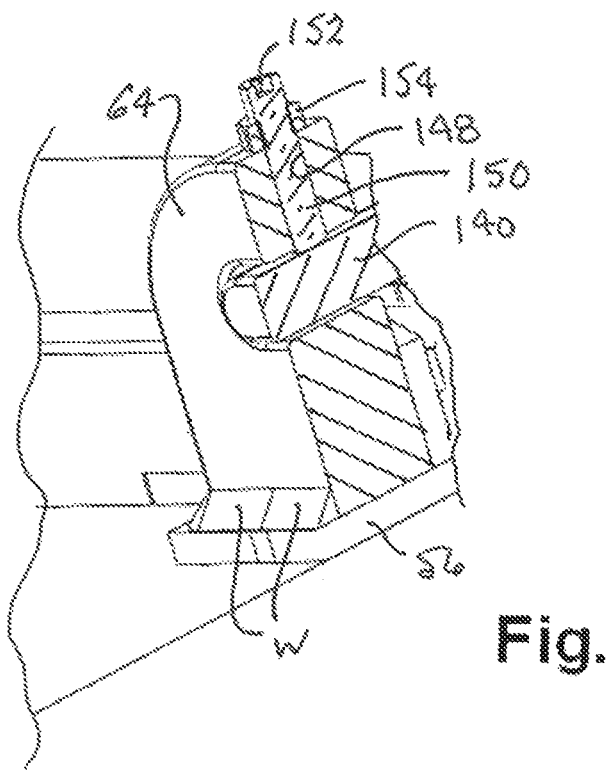
FIG. 19 is a perspective view of FIG. 18 on a slightly smaller scale.

For mitigating the vibration potential without adversely affecting the ability to quickly unlock a locking mechanism when needed, each catch 58, 60, 62, 64 has a snubber for mitigating or even thwarting vibration of a locking shaft induced by vehicle operation. As shown in FIGS. 18 and 19, a portion of a catch, such as catch 64, to one side of its throat has a threaded hole 148 into which a screw 150 is threaded. The screw has length that extends from a blunt end inside the throat of the catch to an outer end beyond the catch. The outer end has a non-circular socket 152 (a hex socket for example) which can be engaged by a suitable tool (hex wrench for example—not shown). When a lug which is disposed in the throat of a catch and has some dimensional clearance from a lug surface to a confronting surface of a catch, the tool is used to turn the screw to place the blunt end of the screw against the lug. The screw is then held in place by running a nut 154 along the exterior of the screw and against the catch as shown. With the blunt end of the screw held against the lug, the screw is effective to snub vibration of a locking shaft.

The escape window assembly which has been described here provides significant improvements in blast resistance to explosive devices typically encountered in ground combat operations. The weldment construction of casing 39 provides strong blast resistance. Locking of window cassette 26 is made more robust because locking mechanisms 30, 32 lock window cassette 26 both to catches proximate the four corners of the window cassette and also to catches proximate the four corners of the margin of windscreen 22 surrounding the through-opening containing the cassette, effectively distributing loads generated by the accelerating vehicle motion interacting against the window cassette inertia. The locking mechanisms themselves are designed to resist distortion from the blast-generated forces, remaining dimensionally stable and allowing quick and reliable operation in an emergency. This is exhibited by the ability of the lower locking pieces to rotate on their shafts 94 relative to the upper locking pieces, preventing torsional deformation. Additionally, the bearing sleeves 96 mitigate sliding friction of shafts 94 on the bearing assembly casings, and they are also slightly crushable which may mitigate effects of dimensional distortion of a shaft. These features enhance the capability of the locking mechanisms to release a cassette from the windscreen after an explosive blast so that the cassette can be removed to providing an alternative exit through the windscreen.

What is claimed is:

1. A window assembly comprising:
a windscreen having a through-opening extending between an interior surface of the windscreen and an exterior surface of the windscreen, the windscreen having opposite margins at respective opposite sides of the through-opening;
a cassette disposed within the through-opening in closure of the through-opening;
the cassette comprising a multi-section metal casing, a first section of which comprises a perimeter wall surrounding an open center within which a transparent armor window, having an interior face and an exterior face, is immovably held closing the open center, the perimeter wall having opposite side walls;
the metal casing comprising a second section having a perimeter wall which is joined with the perimeter wall of the first section and which surrounds an open center which is open to the open center of the perimeter wall of the first section, the perimeter wall of the second section having opposite occluding zones, a respective one of which occludes a zone of the interior face of the transparent armor window which is adjacent a respective one of the opposite side walls of the perimeter wall of the first section;
catches mounted on each occluding zone opposite the zone of the interior face of the transparent armor window which the respective occluding zone occludes; and a respective locking mechanism mounted on each opposite margin of the windscreen for releasably locking the cassette to the windscreen, each locking mechanism comprising a locking shaft which is guided for lengthwise translation relative to the windscreen along a respective side wall of the first section for selectively locking the cassette to, and releasing the cassette from, the windscreen; the locking shafts having locking lugs which engage the catches when the locking shafts are translated to lock the cassette to the windscreen, and which disengage the catches when the locking shafts are translated to release the cassette from the windscreen.

2. The window assembly as set forth in claim 1 in which the through-opening of the windscreen has a rectangular shape whose longer dimension runs widthwise and whose shorter dimension runs heightwise, and in which the locking mechanisms are mounted on respective opposite margins of the windscreen at widthwise ends of the through-opening.

3. The window assembly as set forth in claim 2 in which the perimeter wall of the first section has a rectangular shape with longer side walls parallel with the longer dimension of the through-opening of the windscreen, the transparent armor window has a rectangular shape closing the open center of the first section, and the opposite occluding zones occlude respective widthwise opposite zones of the interior face of the transparent armor window while leaving a portion of the transparent window between them unoccluded.

4. The window assembly as set forth in claim 3 in which two catches are mounted on each occluding zone at spaced apart locations along length of the locking shaft of the respective locking mechanism.

5. The window assembly as set forth in claim 4 in which a first catch on each occluding zone is disposed on an area of the occluding zone which occludes an area adjoining one corner of the transparent armor window, and a second catch on each occluding zone is disposed on an area of the occluding zone which occludes an area adjoining another corner of the transparent armor window.

6. The window assembly as set forth in claim 5 in which each locking shaft is guided for translation relative to the windscreen in a direction heightwise of the through-opening of the windscreen, each first catch is disposed heightwise above the respective second catch, the first catches have throats opening widthwise of the windscreen away from each other, the second catches have throats each of which opens in a direction parallel with a direction in which translation of the respective locking shaft releases the cassette from the windscreen, and each locking shaft comprises first and second locking lugs which move into and out of the throats of the respective first and second catches with translation of the locking shaft.

7. The window assembly as set forth in claim 6 in which the second locking lugs which move into and out of throats of the second locking catches are constrained against translation along length of the respective locking shaft while being allowed to turn on the respective locking shaft.

8. The window assembly as set forth in claim 6 in which at least one of the catches has a snubber which can be moved into contact with a locking lug disposed in a catch throat and constrained from coining out of contact with the locking lug.

9. The window assembly as set forth in claim 6 in which each locking mechanism comprises a lever which is operable to impart translation to the respective locking shaft.

10. The window assembly as set forth in claim 9 in which each lever comprises an inner lever arm and an outer lever arm disposed to either side of the respective locking shaft, a respective pivot block is disposed between each inner lever arm and outer lever arm and is affixed to the respective locking shaft, a respective pivot shaft passes through aligned through-holes in each inner lever arm, pivot block, and outer lever arm to mount the inner lever arm and the outer lever arm for pivotal motion on the pivot block about a pivot axis which lies in a plane perpendicular to length of the respective locking shaft.

11. The window assembly as set forth in claim 10 in which each inner lever arm and outer lever arm comprises a respective sector plate having a surface geometrically defined by an arc of a circle centered on the pivot axis and bounded at ends of the arc by radial surfaces lying on respective radii of the arcs, the arcs being geometric mirror images of each other as viewed in a direction parallel with of the pivot axis.

12. The window assembly as set forth in claim 11 in which each locking mechanism further comprises a fulcrum mounted on the windscreen and having a fulcrum surface facing the radial surfaces of the sector plates at one end of their arcs when the locking mechanism is locking the cassette to the windscreen, each lever having a handle for turning the lever about the pivot axis to initiate release of the cassette from the windscreen by causing the one end of the arcs of the sector plates to bear against the fulcrum surface and initiate translation of the locking shaft in a direction for releasing the cassette from the windscreen by transmission of force to the locking shaft, the force being created by the sector plates bearing on the fulcrum surface and being transmitted to the locking shaft via the pivot shaft and pivot block.

13. The window assembly as set forth in claim 12 in which the handle is more distant from the pivot axis than are the one end of the arcs thereby creating a mechanical advantage for the lever to translate the shaft.

14. The window assembly as set forth in claim 13 further comprising additional catches mounted on the interior surface of the windscreen adjacent each locking mechanism, the locking lugs on the shafts include lugs which engage the additional catches when locking the cassette to the windscreen and which disengage the additional catches when the locking shafts release the cassette from the windscreen.

15. The window assembly as set forth in claim 14 in which the locking mechanisms further comprise carrier bars, each of which is welded to a respective margin of the windscreen, and contains the respective fulcrum and the respective additional catches, and on each of which are mounted bearing assemblies which guide lengthwise translation of the respective locking shaft relative to the windscreen, each bearing assembly comprising a casing mounted on the carrier bar and having a through-hole through which the locking shaft passes, and the bearing assembly further comprising a bearing sleeve fitted to the through-hole to separate the locking shaft from the casing.

16. The window assembly as set forth in claim 15 further including bearing tape strips disposed on the carrier bars to mitigate friction between the carrier bars and parts of the locking mechanisms which may unintentionally come into contact with the carrier bars.

17. The window assembly as set forth in claim 3 in which the multi-section metal casing comprises a third section having a rectangular perimeter wall which is joined with the perimeter wall of the second section and which surrounds an open center which is open to the open center of the perimeter wall of the second section, the rectangular perimeter wall of the third section fitting with conformity within and to the rectangular through-opening of the windscreen.

18. The window assembly as set forth in claim 17 in which the windscreen comprises an inner frame part and an outer frame part which are welded together, and the through-opening extends through both the inner frame part and the outer frame part.

19. The window assembly as set forth in claim 17 in which the second section fits to the first section and to the third section by tabs in one section which fit to and pass through through-slots in the other section, and weldments join the second section with the first section and with the third section.

20. The window assembly as set forth in claim 1 further comprising a lock for locking each locking mechanism to prevent translation of the mechanism's locking shaft when the locking mechanism is locking the cassette to the windscreen.

21. A window assembly comprising:
 a windscreen having a through-opening extending between an interior surface of the windscreen and an exterior surface of the windscreen, the windscreen having opposite margins at respective opposite sides of the through-opening;
 a cassette disposed within the through-opening in closure of the through-opening;
 the cassette comprising a multi-section metal casing, a first section of which comprises a perimeter wall surrounding an open center within which a transparent armor window, having an interior face and an exterior face, is immovably held closing the open center, the perimeter wall having opposite side walls;
 the metal casing comprising a second section having a perimeter wall which is joined with the perimeter wall of the first section and which surrounds an open center which is open to the open center of the perimeter wall of the first section, the perimeter wall of the second section having opposite occluding zones, a respective one of which occludes a zone of the interior face of the transparent armor window which is adjacent a respective one of the opposite side walls of the perimeter wall of the first section;
 catches mounted on each occluding zone opposite the zone of the interior face of the transparent armor window which the respective occluding zone occludes;
 a respective locking mechanism mounted on each opposite margin of the windscreen for releasably locking the cassette to the windscreen, each locking mechanism comprising a locking shaft which is guided for lengthwise translation relative to the windscreen along a respective side wall of the first section for selectively locking the cassette to, and releasing the cassette from, the windscreen; the locking shafts having locking lugs which engage the catches when the locking shafts are translated to lock the cassette to the windscreen, and which disengage the catches when the locking shafts are translated to release the cassette from the windscreen;
 the through-opening of the windscreen has a rectangular shape whose longer dimension runs widthwise and whose shorter dimension runs heightwise, and in which the locking mechanisms are mounted on respective opposite margins of the windscreen at widthwise ends of the through-opening; and
 the perimeter wall of the first section has a rectangular shape with longer side walls parallel with the longer dimension of the through-opening of the windscreen, the transparent armor window has a rectangular shape closing the open center of the first section, and the opposite occluding zones occlude respective widthwise opposite zones of the interior face of the transparent armor window while leaving a portion of the transparent window between them unoccluded.

\* \* \* \* \*